Aug. 14, 1956  B. S. LILES  2,758,964
CONTINUOUS ELECTRODE AND METHOD OF MAKING THE SAME
Filed Aug. 12, 1952
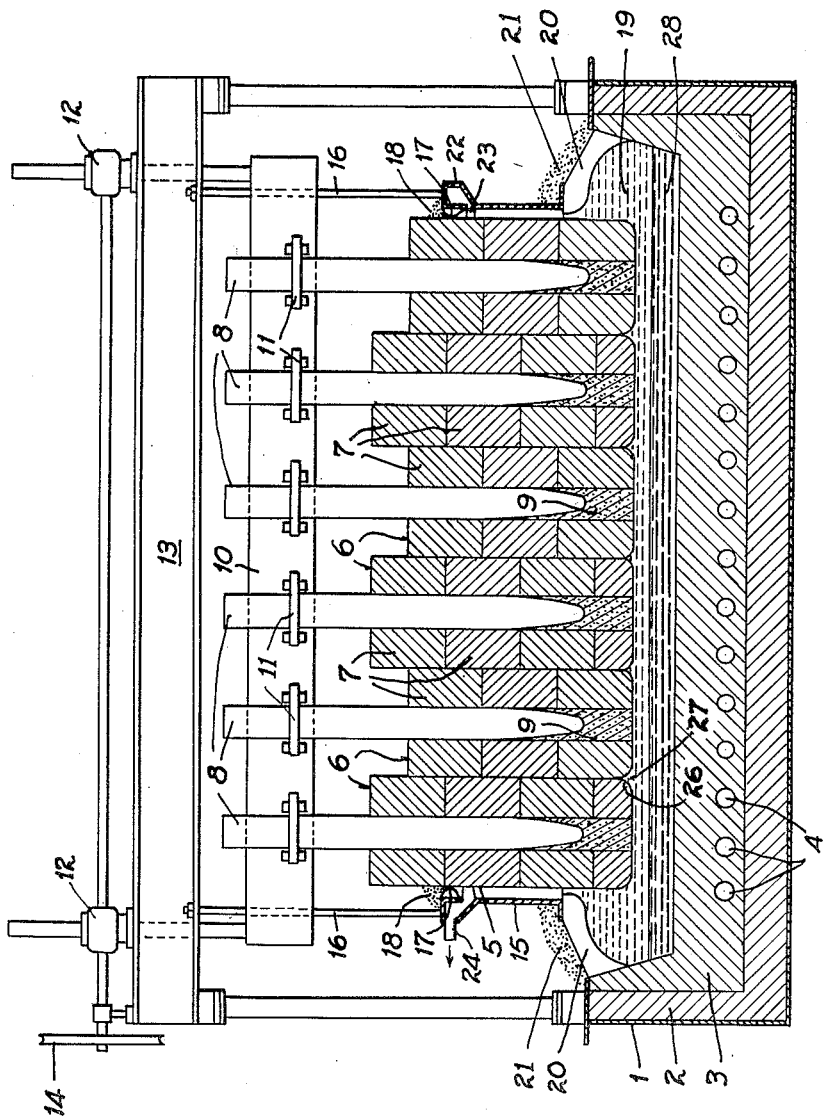
INVENTOR.
Brooks S. Liles.
BY
Edward B. Foote
ATTORNEY

United States Patent Office 2,758,964
Patented Aug. 14, 1956

2,758,964
CONTINUOUS ELECTRODE AND METHOD OF MAKING THE SAME

Brooks S. Liles, Badin, N. C., assignor to Aluminum Company of America, Pittsburgh, Pa., a corporation of Pennsylvania Application August 12, 1952, Serial No. 303,919

7 Claims. (Cl. 204—67)

This invention relates to electrodes of the so-called continuous type, in which carbonaceous material is added to one end of the electrode to replace material consumed at the opposite end.

It is an object of my invention to provide an improved continuous electrode, and an improved method for making continuous electrodes. It is a further object of this invention to provide a commercially feasible method for making and operating continuous electrodes composed of blocks of baked carbonaceous material which are bonded together into a composite unit carried by vertical rods that extend into the carbonaceous material and supply electric current thereto. A further object of the invention is to provide a continuous electrode assembly in which the electrode is made from pre-baked carbonaceous material, and is protected against oxidation of the side walls thereof.

In accordance with my invention an electrode is assembled as a unitary structure from blocks of carbonaceous material. Such blocks may be prepared in the well-known manner for making baked carbon electrodes, which in general consists in mixing coke or a coking material and a binder, such as tar or pitch, shaping the mix, and then baking it at a high temperature to drive off volatile material, increase the density of the mix, and make the blocks good conductors of electricity. The electrode is composed of a series of vertical rows or columns of such blocks, the individual rows consisting of a plurality of the blocks disposed one above the other, with the adjoining blocks in the row bonded together. Likewise, the adjoining rows of blocks are bonded to each other.

To bond the blocks and rows together as described above, a cementing material is used which bakes into a hard, electrically conductive substance at temperatures to which the electrode becomes heated in use. A mixture composed of 65% of finely ground petroleum coke, and 35% coal tar is an example of a satisfactory cement. Although the bonding material provides a strong, conductive joint between the blocks, it is ordinarily not as strong or as highly conductive as the blocks themselves. To avoid having the bonding material create a plane of higher resistance across the electrode, and also to provide a stronger structure, the horizontal joints between blocks in the individual rows of blocks in the electrode are out of alignment with the horizontal joints in adjoining rows.

The individual rows have one or more vertical cavities therein, formed by aligned holes extending through the blocks comprising the row. Contact rods for supplying current to the electrode extend downwardly into such cavities and are bonded to the electrode by means of bonding material in the cavities. The contact rods project above the upper surface of the electrode, and are carried by a support which also feeds electric current to the rods.

As its lower surface burns away in use, the electrode is lowered to maintain the bottom thereof at the desired level. Also, additional blocks of carbonaceous material are bonded to the top of the electrode periodically by means of the above-mentioned cementing material, to replace material burned from the lower end of the electrode. To permit building up the electrode in that manner, the aforesaid contact rods are removed from the electrode—after being disconnected from the current source—by first rotating them about their longitudinal axis to loosen them from the electrode, after which they are lifted out of the cavity which they had occupied in the electrode. Cementing material is spread on the top of the uppermost block of the column from which the rod has been removed, and a new block of carbonaceous material having a hole extending through it is then placed on top of the cementing material. A sufficient amount of cementing material is used that, under the weight of the newly-added block, enough of the cementing material is forced into the space between the newly-added block and the laterally-adjacent blocks to bond such blocks together firmly. However, if desired, part or all of the cementing material for such vertical joints can be provided after the newly-added block is in place. The aforesaid hole through the newly-added block is aligned vertically with the cavity from which the contact rod was removed, so as to form a continuation of that cavity.

Carbonaceous cement is placed in the cavity, and then the contact rod is reinserted in the column, with its lower portion extending into the cement to the desired level in the electrode. The amount of carbonaceous cement introduced into the cavity should be sufficient that the lower end of the contact rod will be well embedded therein when the rod is reinserted in the electrode to the desired higher level. Moreover, it is preferable that the cavity contain enough of the aforesaid cement that after the contact rod has been repositioned the cement will extend upward across at least the lowermost horizontal joint—and preferably across all of the joints—of the row in which the rod has been inserted, for when the cement bakes it then acts as a dowel pin across the joint, or joints.

The rod is then reconnected to its support. The cement bakes rapidly and firmly to the lower portion of the contact rod and to the carbonaceous electrode, providing a good mechanical and electrical connection between the rod and the electrode. Likewise, the cementing material between blocks bakes into a hard, strong, conductive joint.

The above process is repeated in building up each of the additional rows of blocks of the electrode, and in view of the rapid baking of the cement to the lower portion of the contact rods and to the carbonaceous electrode it is possible to add blocks to all of the rows, and reset all of the contact rods, in a very short period. While the process is being carried out in connection with one column of blocks, the electrode is supported by rods of other columns.

The blocks added to the respective rows in the electrode are of proper height to continue the above-mentioned staggered relationship of the horizontal joints in adjoining rows of blocks. In reinserting the contact rods in the electrode, the rods are so positioned that the lower ends of the re-positioned rods are all in approximately the same horizontal plane. As a result, substantially uniform current distribution is obtained in the lower portion of the electrode. If desired more than one contact rod per column of blocks may be employed, in which case all of the rods for that column are removed before adding a new block to that column, and the block added is provided with the appropriate number of holes therethrough to accommodate the rods. When it becomes desirable—in operation of the apparatus— to raise the contact rods to a higher level in the electrode without adding new blocks of carbonaceous material, that can be done by following the same procedures as described above, except that the step of attaching new blocks to the electrode is omitted.

The electrode is protected against oxidation of the sides thereof by surrounding it with a casing spaced slightly from it through which the electrode can be lowered as desired. Preferably the casing is provided with a resilient extension projecting inwardly into contact with the side wall of the electrode to exclude air from the space between the casing and the electrode, and likewise to prevent gases in the furnace from escaping between the electrode and the casing. A portion of the casing may also serve as a manifold for collecting gases generated in the furnace.

The accompanying drawing illustrates an embodiment of the invention in connection with an electric furnace or cell for producing aluminum by electrolytic reduction of alumina in a bath of molten fluorides. Such baths are well-known, and for that reason their composition will not be described here. In the drawing the cell proper is of conventional construction, consisting of a metal shell 1, insulation 2, a carbon lining 3, and the cathode rods 4. The anode 5 of the cell is composed of a series of vertical columns 6 of carbon blocks 7, stacked one above the other. The adjoining columns of blocks are bonded together vertically by a thin layer of carbonaceous cement, and likewise the adjoining blocks in each individual column are bonded together horizontally by a similar layer of such cement. The blocks forming each individual column are so arranged that the cemented horizontal joints of adjoining columns are in staggered relationship.

The blocks forming the columns 6 have a vertical aperture therethrough, the apertures in the blocks in each column being aligned to form a cavity extending longitudinally of the column. Metal contact rods 8 extend downward into such cavities, and are bonded to the blocks 7 by carbonaceous cement which extends upward around the contact rod, as indicated at 9. The lower ends of the rods are all in substantially the same horizontal plane. The rods are attached to the electrical bus bar 10 by means of clamps 11, which are carried by the bus bar. Consequently, the bus bar serves both to support the anode and to feed electric current to it, through the rods 8. The bus bar 10, which is connected to a source of electric current (not shown), is carried by screw jacks 12 mounted on a transverse beam 13 and operated by a pulley 14. The bus bar may be raised or lowered by the screw jacks to adjust the position of the anode with respect to the molten material in the cell, in accordance with well-known practice.

The side wall of the anode is protected from the air by a metal casing 15 which is carried by rods 16 attached to the beam 13, and surrounds the anode for a portion of the latter's height. The casing is spaced slightly from the anode, but carries an inwardly projecting sheet metal extension 17 which encircles the anode and is in contact with the side wall thereof to prevent flow of air or furnace gas through the space between the casing and the anode. The extension 17 is flexible and resilient to insure contact of it with the side wall of the anode at all times and yet permit movement of the anode relative thereto without damage to the anode. Any suitable material 18—such as cryolite, alumina, oakum, or carbonaceous cement—may be placed between the anode wall and the upper portion of the extension 17 to provide a further gas seal.

The anode extends into the layer 19 of molten fluorides containing dissolved alumina of the cell; the molten aluminum produced in the cell accumulates below that layer. The lower edge of the casing 15 is in contact with the solidified crust 20 on the surface of the layer 19, and a layer 21 of alumina covers the aforesaid crust, and the lower portion of the casing, with the result that the lower part of the casing and the crust and alumina thereon provide a seal against escape of gases generated in the cell. Alternatively, such a seal may be provided by having the lower edge of the casing embedded in the layer 21, but not contact the crust 20.

The aforesaid furnace gases consist of a mixture of $CO$, $CO_2$, and fluorine-containing compounds. The casing 15 includes a manifold 22 extending around the upper portion thereof for the collection and removal of those gases. The gases rise through the space between the anode and the casing, and enter the manifold through an aperture 23 in the casing. The gases escape from the manifold through an outlet pipe 24. With the gas-collecting arrangement described above, the hot cell gases led to the upper portion of the casing serve to heat the anode, thus saving electrical energy, particularly in baking the carbonaceous cement.

To compensate for burning away of the lower end of the anode in use, additional blocks of anode material are attached periodically to the upper surface of the various columns 6 of the anode. In effecting that operation as to any particular column of blocks in the electrode, the contact rod 8 of that column is unclamped from the bus bar 10, and the rod is broken loose from the cement which bonds it to the anode by rotating the rod axially. The rod is then lifted out of the anode. A block of the carbonaceous material used in the anode is next cemeted to the top of the column, and to the adjoining blocks in adjacent rows, by means of carbonaceous cement. A hole extends vertically through the new block, and the block is so positioned that that hole is aligned with the cavity from which the contact rod was removed. Preferably the upper and lower faces of the blocks are grooved so that they have complementary recesses and projections in the two blocks being bonded together, thereby facilitating proper positioning of the blocks and also providing a stronger joint.

Unbaked carbonaceous bonding material is fed into the vertical cavity in the column, after which the contact rod is reinserted in the column and forced down into the bonding material before the latter has solidified. The amount of bonding material fed into the cavity is properly proportioned to permit the lower end of the contact rod to be located at the desired distance above its previous position in the anode. Preferably enough bonding material is employed that some of it is squeezed up between the contact rod and the cavity wall across the newly-formed horizontal joint in the column. The upper end of the contact rod can thereafter be clamped to the bus bar 10 by its clamp 11. The bonding material in the cavity bakes rapidly to the contact rod and to the anode in only a few minutes, and provides a good electrical and mechanical connection between the rod and the anode. Likewise, the bonding material between adjoining blocks bakes to provide a hard, conductive joint.

In the above-described way, each of the columns 6 is extended, and the rods 8 are re-positioned, the contact rods each being re-positioned so that their lower ends are all at substantially the same level. The new blocks added to the top of the respective columns are of proper height that the alternate columns are staggered in height, so that the joints formed when further blocks are bonded thereto in accordance with the procedures described above will be in staggered relationship.

It is desirable that the carbon anodes used in cells for the electrolytic production of aluminum from alumina be baked at a temperature somewhat higher than those at which the anodes normally operate, in order to secure the desired degree of electrical conductivity, maximum resistance to burning, and minimum evolution of gas from the anode. The carbonaceous anode described above consists of blocks that have been pre-baked at such temperature, with the result that except as to the bonding material the above-mentioned advantages of anodes baked at temperatures above the operating temperature of the cell can be achieved; the proportion of bonding material used and baked in the anode during operation of the cell is relatively small and insignificant as far as securing those advantages is concerned.

Continuous carbon electrodes made in accordance with my invention have additional advantages. For example, in the electrolytic production of aluminum by the use of such an electrode instead of non-continuous pre-baked electrodes of comparable current-carrying capacity, a substantial saving can be effected in the kwh. used per pound of aluminum produced. In addition, carbon consumption per pound of aluminum can be materially reduced.

During electrolytic production of aluminum, gas is generated below the anode. Such gas tends to accumulate beneath the anode—particularly when anodes of large cross-section are employed—and interfere with the efficiency of operation. However, with anodes of the type described above, the bonding material between the adjoining columns is baked at a lower temperature than the blocks, and is less dense than the blocks. Consequently, it is consumed slightly more rapidly than the blocks. Moreover, the lower edges of the lowermost blocks become rounded, as indicated at 26 in the drawing, apparently due to burning of those edges and to erosion of them by the molten bath. For those reasons channels 27 are formed between the columns of blocks. Such channels extend across the underside of the anode, from one side to the other thereof, and serve as routes of escape for gas from under the anode.

Aluminum produced in the cell accumulates in the lower portion of the cell cavity, the molten aluminum layer being indicated at 28. It can be removed from the cell by well-known procedures.

Various modifications can be made in the illustrated apparatus without departing from the principles of my invention. For example, more than one contact rod may be provided for each column 6, if the width of the column makes it advantageous to do so. Furthermore, a second row of columns of blocks may be bonded alongside of the row shown in the drawing to increase the width of the electrode. In that case it is desirable that the horizontal joints in the adjoining columns of the second row be in staggered relationship as described above, and also that the horizontal joints in adjoining columns in the two respective rows of columns likewise be staggered, for the reasons previously given. Vertical contact rods may be provided for the columns of the second row, and new blocks can be added to those columns by following the same procedures as were described above, in which case the contact rods in both rows are positioned with their lower ends at substantially the same level in the electrode.

I claim:

1. In the operation of an electric furnace having an electrode therein comprising a plurality of vertical columns of carbonaceous material, the said columns being bonded together into a unitary structure, and a plurality of the said columns each having a cavity therein and a current-carrying rod extending downwardly into the said cavity and bonded in place therein, the method of compensating for consumption of material from the bottom of the electrode comprising periodically withdrawing the said rods from their respective cavities, bonding blocks of carbonaceous material having a hole therethrough to both the top of the individual columns and the side wall of the laterally adjoining columns while the rods are in withdrawn position, with the said hole registering with the said cavity in the column to the top of which the block is bonded, the said blocks having been prebaked at a temperature higher than the normal operating temperature of the electrode, introducing carbonaceous paste into the cavities from which the rods have been withdrawn, and subsequently inserting the withdrawn rods through the said holes in the added blocks and into the respective cavities therefor and the said paste therein to a position in which the lower end of the rod is at higher level than it occupied prior to withdrawal of the rod as aforesaid, and baking the said carbonaceous paste in the cavities to the rods therein.

2. The method according to claim 1, in which the transverse joints formed in adjoining columns by the said bonding of blocks of carbonaceous material to the tops of such columns are offset vertically with relation to each other.

3. The method according to claim 1, in which in the said step of re-inserting the said rods the lower ends of the said rods are all inserted to substantially the same level in the respective cavities therefor.

4. An electrode comprising a plurality of vertical columns of carbonaceous material which are bonded together into a unitary structure by a layer of carbonaceous cement intermediate adjoining columns, the individual columns each being composed of blocks of carbonaceous material that have been baked at a temperature higher than the normal operating temperature of the electrode, the said blocks being positioned one above the other in the columns, with the adjoining blocks in individual columns being bonded together by a layer of carbonaceous cement extending transversely of the column, and the said transverse joints in the individual columns being offset vertically from the transverse joints of adjoining columns, each of a plurality of the said columns having a vertically disposed cavity therein extending downward from the top of the column and formed by aligned holes through blocks in the column, each of such cavities having a vertically disposed current-carrying rod extending downwardly into it from above and bonded in place in the cavity.

5. An electrode in accordance with claim 4, in which the lower ends of all of the said rods are at substantially the same level.

6. An electrode in accordance with claim 4, in which the said rods are electrically connected to their respective columns above the lowermost transverse joint in the column.

7. In an electric furnace, a vertically movable electrode comprising a plurality of vertical columns of carbonaceous material, the adjoining columns being bonded together by a layer of carbonaceous cement, and the individual columns each being composed of blocks of carbonaceous material that have been baked at a temperature higher than the normal operating temperature of the electrode, the said blocks being positioned one above the other in the columns, with the adjoining blocks in individual columns being bonded together by a layer of carbonaceous cement extending transversely of the column, and the said transverse layers in the individual columns being offset vertically from the transverse layers of adjoining columns, each of a plurality of the said columns having a vertical cavity therein extending downward from the top of the column and formed by aligned holes through blocks in the column, each of such cavities having a vertically disposed current-carrying rod extending downwardly into it from above and bonded in place in the cavity, a fixedly positioned casing surrounding the said electrode and spaced from it, and sealing means extending between the upper portion of the said casing and the said electrode for preventing the escape of gas between the casing and the electrode, the said casing having a gas outlet below the said sealing means.

References Cited in the file of this patent

UNITED STATES PATENTS

| | | |
|---|---|---|
| 1,442,031 | Soderberg | Jan. 9, 1923 |
| 1,442,033 | Sem et al. | Jan. 9, 1923 |
| 1,639,007 | Sem | Aug. 16, 1927 |
| 1,655,324 | Miguet | Jan. 3, 1928 |
| 1,707,406 | Miguet | Apr. 2, 1929 |
| 1,972,849 | Wisdom | Sept. 4, 1934 |
| 2,003,653 | Miguet et al. | June 4, 1935 |
| 2,224,739 | Manfredini | Dec. 10, 1940 |
| 2,526,876 | Sejerstedt | Oct. 24, 1950 |

FOREIGN PATENTS

| | | |
|---|---|---|
| 363,551 | Italy | Oct. 7, 1938 |
| 58,956 | Germany | Oct. 10, 1891 |
| 601,873 | Great Britain | May 13, 1948 |